(12) United States Patent
Sato et al.

(10) Patent No.: US 11,424,488 B2
(45) Date of Patent: Aug. 23, 2022

(54) RECTANGULAR SECONDARY BATTERY

(71) Applicant: Hitachi Automotive Systems, Ltd., Hitachinaka (JP)

(72) Inventors: Takeshi Sato, Hitachinaka (JP); Hideki Shinohara, Hitachinaka (JP); Akinori Tada, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 147 days.

(21) Appl. No.: 15/514,277

(22) PCT Filed: May 21, 2015

(86) PCT No.: PCT/JP2015/064598
§ 371 (c)(1),
(2) Date: Mar. 24, 2017

(87) PCT Pub. No.: WO2016/047199
PCT Pub. Date: Mar. 31, 2016

(65) Prior Publication Data
US 2017/0294684 A1 Oct. 12, 2017

(30) Foreign Application Priority Data
Sep. 26, 2014 (JP) ............................. JP2014-197222

(51) Int. Cl.
*H01M 10/0587* (2010.01)
*H01M 50/531* (2021.01)
(Continued)

(52) U.S. Cl.
CPC ... *H01M 10/0587* (2013.01); *H01M 10/0525* (2013.01); *H01M 50/531* (2021.01); *H01M 50/533* (2021.01); *H01M 2220/20* (2013.01)

(58) Field of Classification Search
CPC .... H01M 2/26; H01M 2/263; H01M 10/0587; H01M 50/531; H01M 50/533
See application file for complete search history.

(56) References Cited

U.S. PATENT DOCUMENTS

| 2007/0026307 | A1 | 2/2007 | Kim | |
| 2011/0244280 | A1* | 10/2011 | Byun | ............... H01M 10/0587 429/61 |

(Continued)

FOREIGN PATENT DOCUMENTS

| CN | 102738428 A | 10/2012 |
| EP | 2 506 358 A1 | 10/2012 |

(Continued)

OTHER PUBLICATIONS

International Search Report (PCT/ISA/210) issued in PCT Application No. PCT/JP2015/064598 dated Jul. 28, 2015 with English translation (5 pages).

(Continued)

*Primary Examiner* — Stephan J Essex
(74) *Attorney, Agent, or Firm* — Crowell & Moring LLP

(57) ABSTRACT

A problem of the present invention is to provide a rectangular secondary battery in which heat generation of a current collecting plate is suppressed. A rectangular secondary battery of the present invention which solves the above-described problem includes: a flat wound group which is obtained by winding a positive electrode and has a positive electrode metal foil-exposed portion; a battery can which stores the wound group; a battery lid which seals the battery can; a positive electrode external terminal which is provided on the battery lid; and a positive electrode current collecting plate which electrically connects the external terminal and the wound group. The positive electrode current collecting plate includes a fixed portion fixed on the battery lid, a welded portion welded on the metal foil-exposed portion of (Continued)

the wound group, and a joint connecting the fixed portion and the welded portion. Further, in the current collecting plate, the joint has a width portion equal to or less than widths of the fixed portion and the welded portion and a thickness portion thicker than the fixed portion or the welded portion.

11 Claims, 17 Drawing Sheets

(51) Int. Cl.
*H01M 50/533* (2021.01)
*H01M 10/0525* (2010.01)

(56) References Cited

U.S. PATENT DOCUMENTS

| | | | | |
|---|---|---|---|---|
| 2011/0318615 | A1* | 12/2011 | Chun | H01M 2/0413 |
| | | | | 429/53 |
| 2012/0251874 | A1* | 10/2012 | Guen | H01M 50/54 |
| | | | | 429/179 |
| 2014/0045047 | A1* | 2/2014 | Yokoyama | H01M 10/0431 |
| | | | | 429/178 |
| 2014/0120396 | A1 | 5/2014 | Kajiwara | |
| 2015/0024259 | A1 | 1/2015 | Lee et al. | |
| 2015/0236328 | A1 | 8/2015 | Shinohara et al. | |

FOREIGN PATENT DOCUMENTS

| | | |
|---|---|---|
| EP | 2 827 406 A1 | 1/2015 |
| JP | 2007-42628 A | 2/2007 |
| JP | 2012-209238 A | 10/2012 |
| JP | 2013-8559 A | 1/2013 |
| JP | 2013-122842 A | 6/2013 |
| JP | 2013-161758 A | 8/2013 |
| JP | 2014-82072 A | 5/2014 |
| JP | 2014082072 A * | 5/2014 |
| JP | 2015-23026 A | 2/2015 |
| WO | WO 2009/013592 A2 | 1/2009 |
| WO | WO 2013/168260 A1 | 11/2013 |
| WO | WO 2014/033827 A1 | 3/2014 |

OTHER PUBLICATIONS

Japanese-language Written Opinion (PCT/ISA/237) issued in PCT Application No. PCT/JP2015/064598 dated Jul. 28, 2015 (5 pages).
European Search Report issued in counterpart European Application No. 15843323.5 dated Apr. 19, 2018 (eight (8) pages).
Extended European Search Report issued in counterpart European Application No. 19165674.3 dated Jul. 19, 2019 (five (5) pages).
Chinese-language Office Action issued in counterpart Chinese Application No. 201580049631.5 dated May 21, 2019 with English translation (eight (8) pages).

* cited by examiner

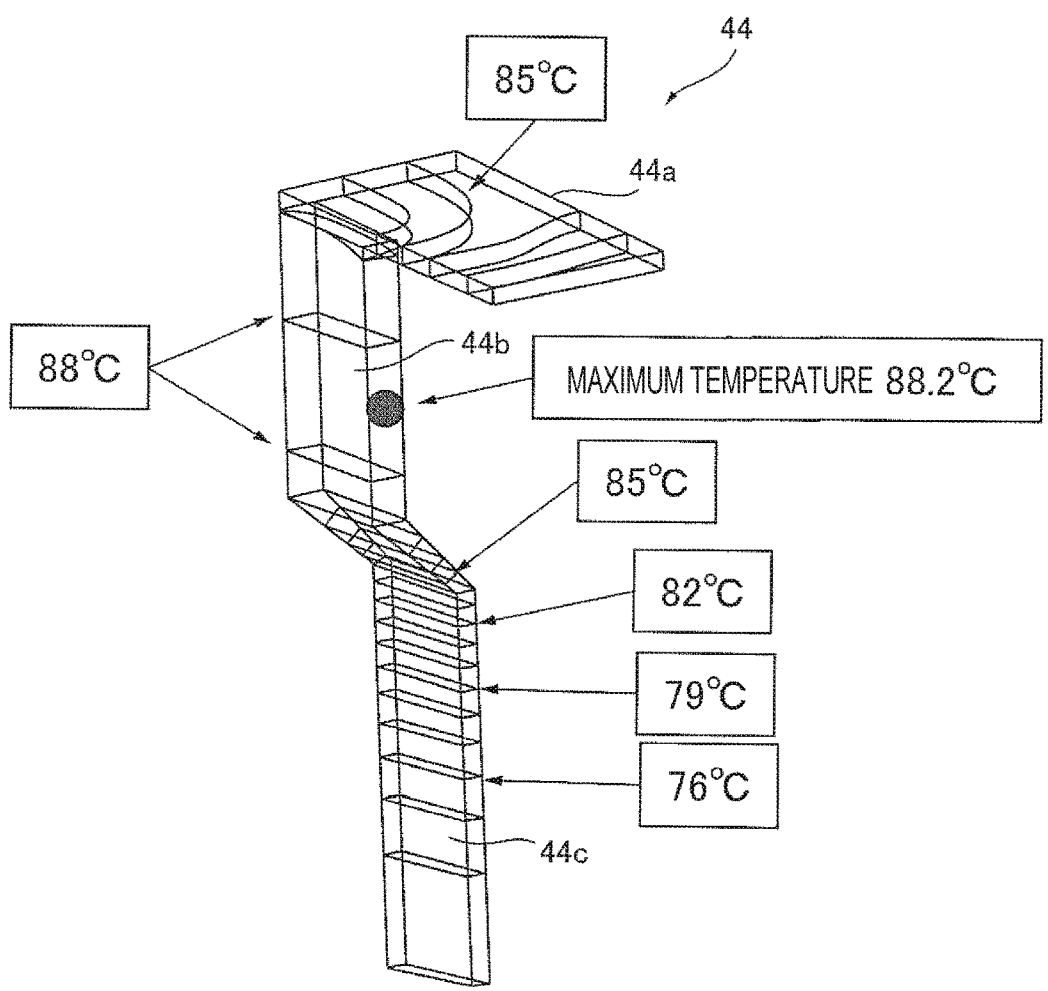

RECTANGULAR SECONDARY BATTERY

TECHNICAL FIELD

The present invention relates to a secondary battery in which a wound group is stored inside a battery can and electric Power is extracted from the wound group through a current collecting plate, and particularly to a rectangular secondary battery in which the structure of the current collecting plate is improved.

BACKGROUND ART

In recent years, cylindrical and rectangular secondary batteries that are batteries having high energy densities have been developed as power sources of electric vehicles and so on. Among these, as a technique that is mostly employed in rectangular secondary batteries, a technique disclosed in PTL 1 is proposed. In this PTL 1, it is described that "There is provided a secondary battery capable of preventing occurrence of positional deviation in each electrode group when a current collecting plate jointed with a plurality of electrode groups is bent to dispose each electrode group at a predetermined arrangement position so that miniaturization of the entire battery can be achieved (see Abstract)." This current collecting plate is mostly produced by performing press processing on a metallic plate, and the thickness thereof is constant.

CITATION LIST

Patent Literature

PTL 1: Japanese Unexamined Patent Application Publication No. 2013-122842

SUMMARY OF INVENTION

Technical Problem

In the rectangular secondary batteries, higher current has been demanded, and heat generation in the current collecting plate inside the cell has become a problem. However, the method for producing the current collecting plate using metallic plate is mainly used and the thickness of the entire current collecting plate is constant. For these reasons, there is limitation on the suppression of heat generation of the current collecting plate.

The present invention has been made in view of the above-described circumstances and an object thereof is to provide a rectangular secondary battery in which heat generation of a current collecting plate is suppressed.

Solution to Problem

A rectangular secondary battery of the present invention to solve the above-described problems includes: a flat wound group which is obtained by winding a positive electrode and a negative electrode and has an electrode foil-exposed portion with a separator interposed therebetween; a battery can which stores the wound group; a battery lid which seals a battery can opening; an external terminal which is provided on the battery lid; and a current collecting plate which electrically connects the external terminal and the wound group inside the battery can, the current collecting plate including a fixed portion facing the battery lid with an insulator interposed therebetween, a welded portion welded on the wound group, and a joint connecting the fixed portion and the welded portion to face the lateral wall of the battery can, wherein the joint has a portion thicker than the fixed portion or the welded portion.

Advantageous Effects of Invention

According to the present invention, heat generation of the current collecting plate can be suppressed. Incidentally, problems, configurations, and effects other than those described above will be apparent from the following description of embodiments.

BRIEF DESCRIPTION OF DRAWINGS

FIG. 6 is a diagram illustrating temperature distribution in a current collecting plate of Example 1.

DESCRIPTION OF EMBODIMENTS

Hereinafter, Examples to which the present invention is applied will be described using drawings. Incidentally, in the following each Example, a case where a rectangular secondary battery is a lithium ion secondary battery will be exemplified; however, the rectangular secondary battery is not limited to the lithium ion secondary battery and can also be applied to other batteries.

EXAMPLE 1

Figure 1:
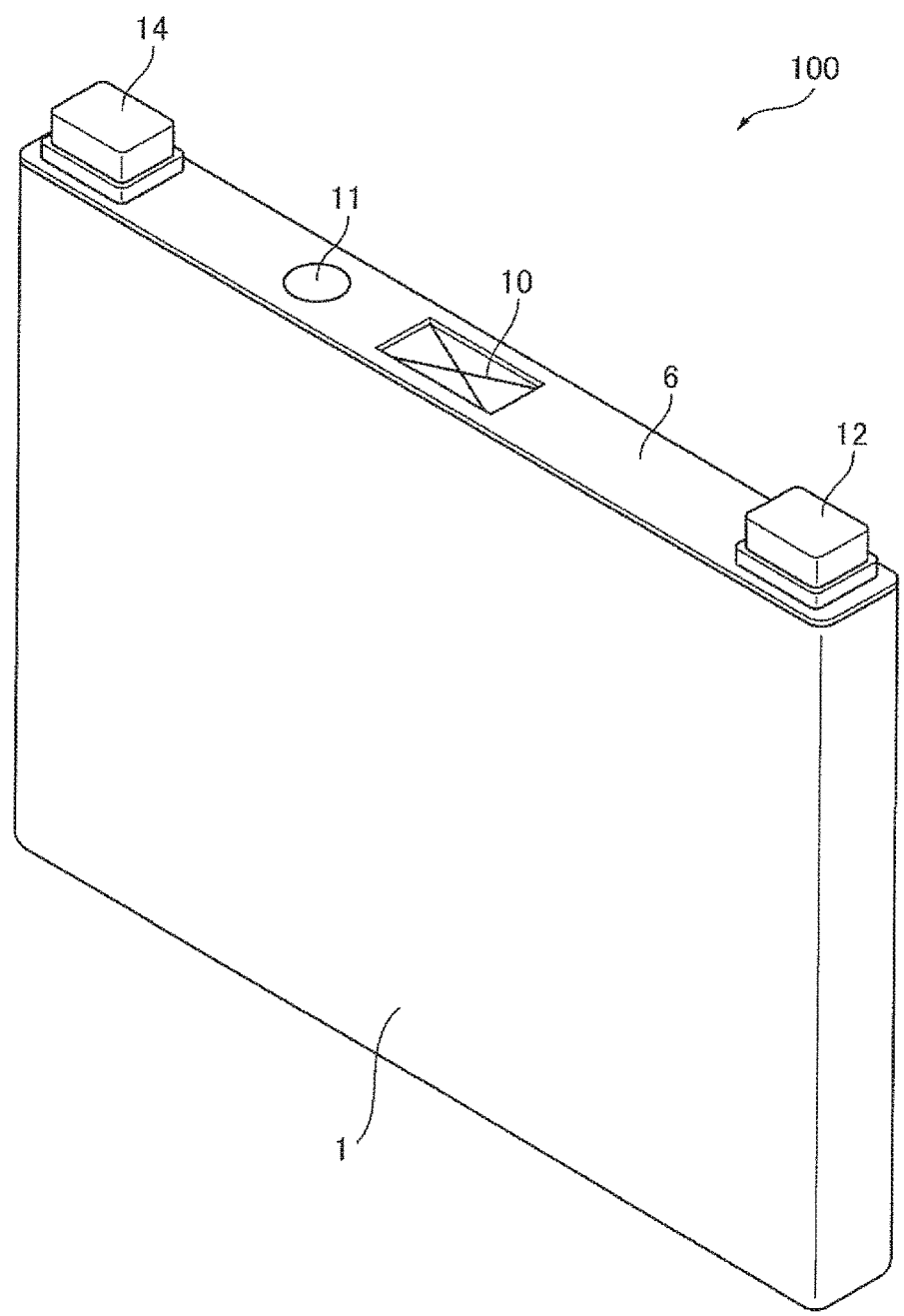
FIG. 1 is an external perspective view of a rectangular secondary battery.
Figure 2:
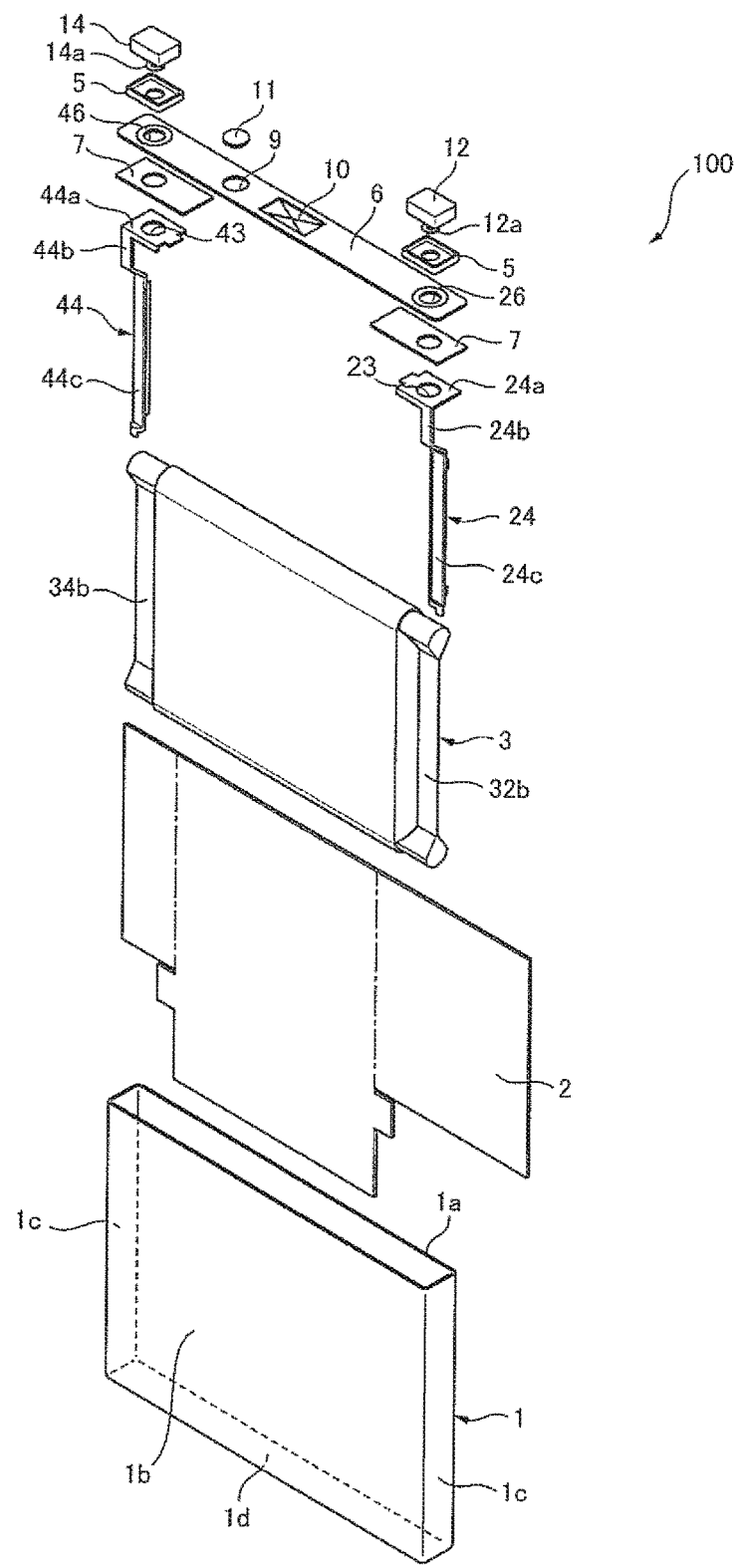
FIG. 2 is an exploded perspective view of the rectangular secondary battery illustrated in FIG. 1.

FIG. 1 is an external perspective view of a rectangular secondary battery and FIG. 2 is an exploded perspective view of the rectangular secondary battery illustrated in FIG. 1.

A rectangular secondary battery 100 is a flat wound battery including a flat wound group 3 and includes a battery can 1 and a battery lid 6 that constitute a battery case storing the wound group 3. The battery can 1 has sides, which include a pair of wide sides 1b facing each other and having a relatively large area and a pair of narrow sides 1c facing each other and having a relatively small area, and a rectangular bottom 1d, and the battery can has an opening 1a opening upward at the upper portion of the battery can.

The wound group 3 is stored in the battery can 1, and the opening 1a of the battery can 1 is sealed by the battery lid 6. The battery lid 6 has a substantially rectangular flat plate shape and is welded to cover the upper opening 1a of the battery can 1 so that the battery can 1 is sealed. The battery lid 6 is provided with a positive electrode external terminal 14 and a negative electrode external terminal 12. Through the positive electrode external terminal 14 and the negative electrode external terminal 12, the wound group 3 is electrically charged and electric power is supplied to an external load. A gas release vent 10 is integrally provided in the battery lid 6, and when the pressure in the battery case is increased, the gas release vent 10 opens, releases gas from the inside, and reduces the pressure in the battery case. Therefore, the safety of the rectangular secondary battery 100 is ensured.

The wound group 3 is stored in the battery can 1 through an insulation protection film 2.

Since the wound group 3 is flatly wound, the wound group includes a pair of curved parts having semicircular cross-sectional shapes and facing each other and a flat part continuously formed between the pair of curved parts. The wound group 3 is inserted into the battery can 1 from one of the curved parts so that the winding axis direction of the wound group 3 coincides with the width direction of the battery can 1. In this state, the other curved part is disposed at the upper opening of the battery can 1.

A positive electrode metal foil-exposed portion 34b of the wound group 3 is electrically connected to the positive electrode external terminal 14 provided on the battery lid 6 through a positive electrode current collecting plate 44. Further, a negative electrode metal foil-exposed portion 32b of the wound group 3 is electrically connected to the negative electrode external terminal 12 provided on the battery lid 6 through a negative electrode current collecting plate 24. Therefore, electric power is supplied from the wound group 3 to an external load through the positive electrode current collecting plate 44 and the negative electrode current collecting plate 24, and electric power generated from the outside is supplied to the wound group 3 through the positive electrode current collecting plate 44 and the negative electrode current collecting plate 24 and the wound group 3 is electrically charged.

For the purpose of the electrical insulation of the positive electrode current collecting plate 44, the negative electrode current collecting plate 24, the positive electrode external terminal 14, and the negative electrode external terminal 12 from the battery lid 6, the battery lid 6 is provided with gaskets 5 and insulating plates 7. Further, an electrolyte is filled into the battery can 1 through an injection vent 9. Thereafter, a vent plug 11 is welded to the battery lid 6 by laser welding to seal the injection vent 9, by which the rectangular secondary battery 100 is hermetically sealed.

Herein, as materials for forming the positive electrode external terminal 14 and the positive electrode current collecting plate 44, for example, an aluminum alloy is mentioned, and as materials for forming the negative electrode external terminal 12 and the negative electrode current collecting plate 24, for example, a copper alloy is mentioned. In addition, as materials for forming the insulating plate 7 and the gasket 5, for example, resin materials having insulation property such as polybutylene terephthalate, polyphenylenesulfide, and perfluoroalkoxy fluorine resins are mentioned.

Further, the injection vent 9 used for injecting an electrolyte into the battery case is formed in the battery lid 6, and the injection vent 9 is sealed by the vent plug 11 after the electrolyte is injected into the battery case. Herein, as the electrolyte to be injected into the battery case, for example, a non-aqueous electrolyte in which a lithium salt such as lithium hexafluorophosphate ($LiPF_6$) is dissolved in a carbonate ester-based organic solvent such as ethylene carbonate can be employed.

Each of the positive electrode external terminal 14 and the negative electrode external terminal 12 has a welding joint part to be joined to a bus bar or the like by means of welding. The welding joint part has a rectangular parallelepiped block shape protruding upward from the battery lid 6 and has a configuration in which the lower surface faces the surface of the battery lid 6 and the upper surface extends in parallel with the battery lid 6 at a predetermined height position.

A positive electrode joint 14a and a negative electrode joint 12a each have a cylindrical shape protruding from the lower surface of each of the positive electrode external terminal 14 and the negative electrode external terminal 12 so that each tip end can be inserted into each of a positive electrode side through-hole 46 and a negative electrode side through-hole 26 of the battery lid 6. The positive electrode joint 14a and the negative electrode joint 12a each protrude through the battery lid 6 to reach the inside of the battery can 1 from each of a fixed portion 44a of the positive electrode current collecting plate 44 and a fixed portion 24a of the negative electrode current collecting plate 24, and each tip end is caulked, by which the positive electrode external terminal 14, the negative electrode external terminal 12, the positive electrode current collecting plate 44, and the negative electrode current collecting plate 24 each are integrally fixed to the battery lid 6. Each gasket 5 is interposed between the positive electrode external terminal 14 and the battery lid 6 and between the negative electrode external terminal 12 and the battery lid 6, and each insulating plate is arranged between the positive electrode current collecting plate 44 and the battery lid 6 and between the negative electrode current collecting plate 24 and the battery lid 6.

The positive electrode current collecting plate 44 and the negative electrode current collecting plate 24 have the fixed portion 44a and the fixed portion 24a in a rectangular plate shape which are arranged to face the lower surface of the battery lid 6 and a welded portion 44c and a welded portion 24c each which are bent at a lateral edge of each of the fixed portion 44a and the fixed portion 24a, extend toward the bottom 1d along the wide side 1b of the battery can 1, and are connected to each of the positive electrode metal foil-exposed portion 34b and the negative electrode metal foil-exposed portion 32b of the wound group 3 in a state of being overlapped on each of the positive electrode metal foil-exposed portion 34b and the negative electrode metal foil-exposed portion 32b to face each of the positive electrode metal foil-exposed portion 34b and the negative electrode metal foil-exposed portion 32b, respectively. A positive electrode side opening 43 and a negative electrode side opening 23 into which the positive electrode joint 14a and the negative electrode joint 12a are respectively inserted are formed in the fixed portion 44a and the fixed portion 24a, respectively.

The insulation protection film 2 is wound around the wound group 3. The insulation protection film 2 is wound around the wound group 3 using a direction along the flat surface of the wound group 3 and perpendicular to the winding axis direction of the wound group 3 as a central axis direction. The insulation protection film 2 is formed by a sheet made of a synthetic resin such as polypropylene (PP) or a plurality of film members, and when winding is performed using a direction parallel to the flat surface of the wound group 3 and perpendicular to the winding axis direction as a winding center, the insulation protection film 2 has such a size that enables the entire wound group to be completely covered by at least one turn or more of winding of the insulation protection film.

Figure 3:
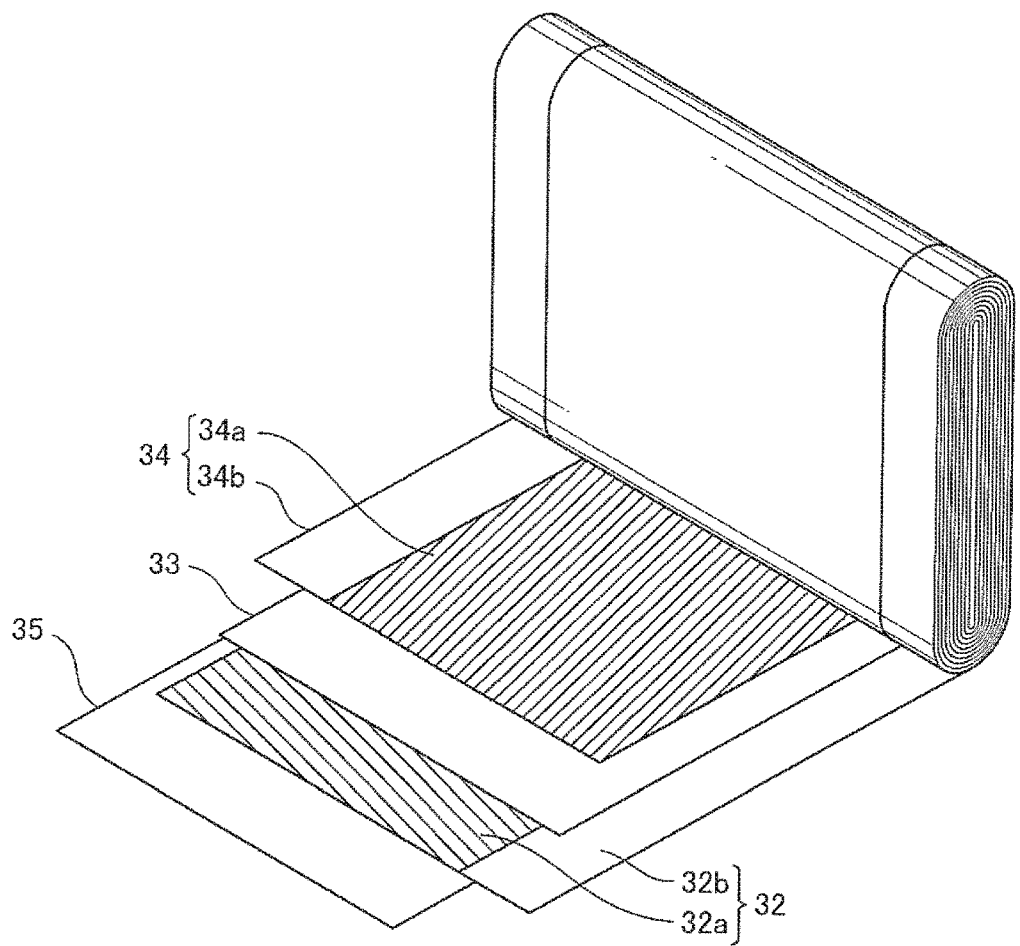
FIG. 3 is an exploded perspective view of a wound group.

FIG. 3 is an exploded perspective view illustrating a state where a part of the wound group is developed.

The wound group 3 is configured by flatly winding a negative electrode 32 and a positive electrode 34 with separators 33 and 35 interposed therebetween. The outermost electrode of the wound group 3 is the negative electrode 32 and the separators 33 and 35 are wound around the outside thereof. The separators 33 and 35 insulate the positive electrode 34 from the negative electrode 32.

A portion to which a negative electrode mixture layer 32a of the negative electrode 32 is applied is larger in the width direction than a portion to which a positive electrode mixture layer 34a of the positive electrode 34 is applied and the portion to which the positive electrode mixture layer 34a is applied is overlapped to be necessarily held by the portion to which the negative electrode mixture layer 32a is applied. The positive electrode metal foil-exposed portion 34b and the negative electrode metal foil-exposed portion 32b are bundled at a flat portion and then connected by welding or the like. Incidentally, the separators 33 and 35 are larger in the width direction than the portion to which the negative electrode mixture layer 32a is applied but are wound at positions where metal foil surfaces are exposed on the ends of the positive electrode metal foil-exposed portion 34b and the negative electrode metal foil-exposed portion 32b. Thus, this does not hamper welding of the bundled exposed portions.

The positive electrode 34 has the positive electrode mixture layer 34a, which is formed by coating both surfaces of a positive electrode metal foil serving as a positive electrode current collector with a positive electrode mixture containing a positive electrode active material, and is provided with the positive electrode metal foil-exposed portion 34b, which is not coated with the positive electrode mixture, at an end of the positive electrode metal foil in one direction of the width direction. The negative electrode 32 has the negative electrode mixture layer 32a, which is formed by coating both surfaces of a negative electrode foil serving as a negative electrode current collector with a negative electrode mixture containing a negative electrode active material, and is provided with the negative electrode metal foil-exposed portion 32b, which is not coated with the negative electrode mixture, at an end of the negative electrode metal foil in the other direction of the width direction. The positive electrode metal foil-exposed portion 34b and the negative electrode metal foil-exposed portion 32b are regions where the metal surface of the electrode foil is exposed, and the wound group 3 is wound such that the positive electrode metal foil-exposed portion 34b and the negative electrode metal foil-exposed portion 32b are disposed at the positions in the one direction and the other direction of the winding axis direction, respectively.

Regarding the negative electrode 32, 10 parts by weight of polyvinylidene fluoride (hereinafter, referred to as PVDF) as a binder was added to 100 parts by weight of amorphous carbon powder as a negative electrode active material, N-methylpyrrolidone (hereinafter, referred to as NMP) as a dispersing solvent was added thereto, and the obtained mixture was then kneaded to thereby prepare a negative electrode mixture. The negative electrode mixture was applied to both surfaces of copper foil (negative electrode metal foil) having a thickness of 10 µm, except for a negative electrode uncoated portion serving as a welded portion. Thereafter, the foil was subjected to drying, pressing, and cutting processes to obtain the negative electrode 32 having a portion coated with the negative electrode active material without containing a copper foil with a thickness of 70 µm.

Incidentally, in this embodiment, a case where amorphous carbon is used as the negative electrode active material has been exemplified, but the negative electrode active material is not limited thereto. The negative electrode active material may be natural graphite allowing insertion and desorption of lithium ions, various artificial graphite materials, carbonaceous materials such as coke, a compound of materials such as Si and tin (for example, SiO or $TiSi_2$), or a composite material thereof. The forms of particles include scaly, spherical, fibrous, and massive forms and are not particularly limited.

Regarding the positive electrode 34, 10 parts by weight of scaly graphite as a conductive material and 10 parts by weight of PVDF as a binder were added to 100 parts by weight of lithium manganate (chemical formula $LiMn_2O_4$) as a positive electrode active material, NMP as a dispersing solvent was added thereto and the obtained mixture was then kneaded to thereby prepare a positive electrode mixture. The positive electrode mixture was applied to both surfaces of aluminum foil (positive electrode metal foil) having a thickness of 20 µm, except for a positive electrode uncoated portion serving as a welded portion. Thereafter, the foil was subjected to drying, pressing, and cutting processes to obtain the positive electrode 34 having a portion coated with the positive electrode active material without containing an aluminum foil with a thickness of 90 µm.

Further, in this Example, a case where lithium manganate is used as the positive electrode active material has been exemplified, but another lithium manganate having a spinel crystal structure, a lithium manganese complex oxide partially substituted by or doped with a metallic element, lithium cobaltate or lithium titanate having a laminar crystal structure, or a lithium-metal composite oxide obtained by substitution or doping of some of these substances with metallic elements may be used.

Further, in this Example, a case where PVDF is used as a binder of a coated portion in the positive electrode and the negative electrode has been exemplified, but any polymer of, for example, polytetrafluoroethylene (PTFE), polyethylene, polystyrene, polybutadiene, butyl rubber, nitrile rubber, styrene-butadiene rubber, polysulfide rubber, nitrocellulose, cyanoethylcellulose, various kinds of latex, acrylonitrile, vinyl fluoride, vinylidene fluoride, propylene fluoride, chloroprene fluoride, acrylic resin, or the like, and a mixture thereof can be used as a binder. Furthermore, as a shaft core, a shaft core configured by winding a resin sheet having higher flexural rigidity than the positive electrode metal foil, the negative electrode metal foil, and the separators 33 and 35 can be used. The wound group 3 may have a structure having no shaft core.

Figure 4:
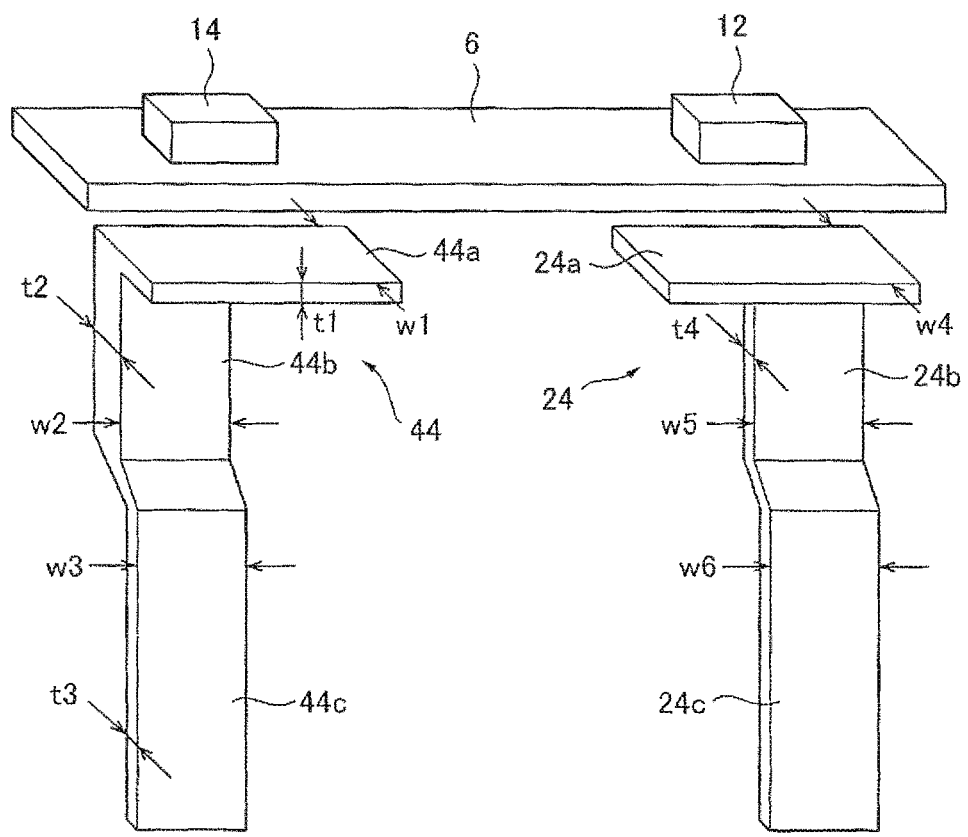
FIG. 4 is an exploded perspective view of a lid assembly in Example 1.
Figure 5A:
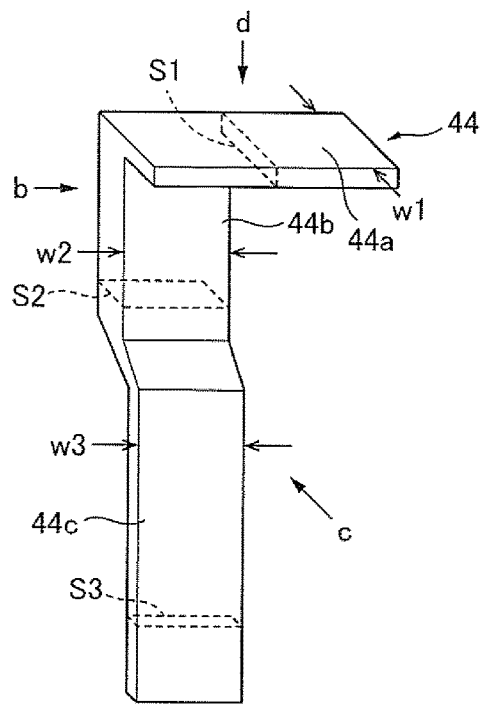
FIGS. 5A-5C are diagrams for describing the configuration of a positive electrode current collecting plate in Example 1.
Figure 5B:
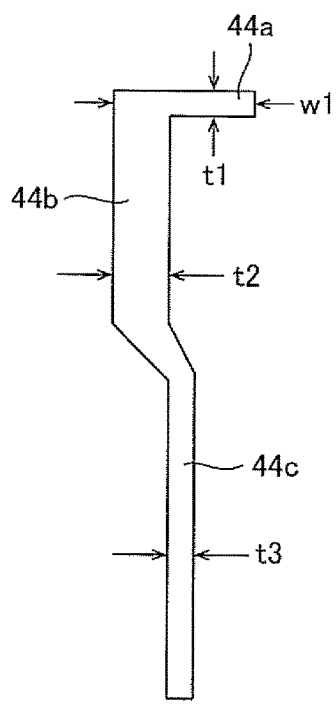
Figure 5C:
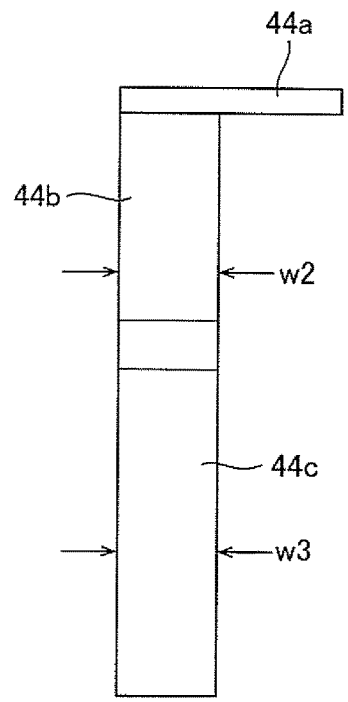

FIG. 4 is an exploded perspective view of a lid assembly in Example 1, and FIGS. 5(a) to 5(c) are diagrams for describing the configuration of a positive electrode current collecting plate in Example 1. FIG. 5(a) is a perspective view schematically illustrating the positive electrode current collecting plate, FIG. 5(b) is a view as seen in the b arrow direction of FIG. 5(a), and FIG. 5(c) is a view as seen in the c arrow direction of FIG. 5(a).

The lid assembly has, as described in FIG. 4, the battery lid 6, the positive electrode external terminal 14 and the negative electrode external terminal 12 which are provided on the battery lid 6, the positive electrode current collecting plate 44 which is integrally caulked and fixed to the battery lid 6 by the positive electrode external terminal 14, and the negative electrode current collecting plate 24 which is integrally caulked and fixed to the battery lid 6 by the negative electrode external terminal 12. The positive electrode current collecting plate 44 has the fixed portion 44a, the joint 44b, and the welded portion 44c, and the negative electrode current collecting plate 24 has the fixed portion 24a, the joint 24b, and the welded portion 24c. Incidentally, actually, the positive electrode side opening 43 and the negative electrode side opening 23 are provided in the fixed portions 44a and 24a respectively but are not illustrated in the drawing.

The fixed portions 44a and 24a are fixed to face the battery lid 6. The welded portions 44c and 24c are welded to the wound group 3. The joints 44b and 24b connect the fixed portions 44a and 24a with the welded portions 44c and 24c respectively and face the lateral wall of the battery can 1.

Regarding the positive electrode current collecting plate 44 and the negative electrode current collecting plate 24, widths w2 and w5 of the joints 44b and 24b are equal to or less than widths w3 and w6 of the welded portions 44c and 24c and widths w1 and w4 of the fixed portions 44a and 24a. In this Example, the widths w1 and w4 of the fixed portions 44a and 24a are largest, and the widths w2 and w5 of the joints 44b and 24b and the widths w3 and w6 of the welded portions 44c and 24c have the same width. Regarding the positive electrode current collecting plate 44, the joint 44b has a width portion equal to or less than the widths of the fixed portion 44a and the welded portion 44c and a thickness portion thicker than the fixed portion 44a or the welded portion 44c.

The negative electrode current collecting plate 24 has a constant thickness t4 in all of the fixed portion 24a, the joint 24b, and the welded portion 24c; meanwhile, in the positive electrode current collecting plate 44 that is the feature configuration of the present invention, a thickness t2 of the joint 44 bis thicker than thicknesses t1 and t3 of the fixed portion 44a and the welded portion 44c.

The positive electrode current collecting plate 44 is produced by casting, forging, or a method using casting and forging in combination. The positive electrode current collecting plate 44 is produced, for example, by casting aluminum or an aluminum alloy. The negative electrode current collecting plate 24 may be produced, similarly to the positive electrode current collecting plate 44, by casting, forging, or a method using casting and forging in combination or may be produced by bending a plate material having a certain thickness.

When the positive electrode current collecting plate 44 is produced by casting, for the purpose that the welded portion 44c can be easily welded to the positive electrode metal foil-exposed portion 34b the wound group 3, polishing processing is performed on the surface of the welded portion 44c.

In a relation among the thickness t1 of the fixed portion 44a, the thickness t2 of the joint 44b, and the thickness t3 of the welded portion 44c, the positive electrode current collecting Plate 44 has a portion satisfying a relation of t2>t1 or t2>t3. In this Example, as FIGS. 5(a) to 5(c), the thickness t2 of the joint 44b is thickest, and the thicknesses t1 and t3 of the fixed portion 44a and the welded portion 44c have the same thickness.

As described above, in the positive electrode current collecting plate 44, the width w2 of the joint 44b is equal to or less than the width w1 of the fixed portion 44a and the width w3 of the welded portion 44c, and the thickness t2 of the joint 44b is thicker than the thickness t1 of the fixed portion 44a and the thickness t3 of the welded portion 44c. Regarding the cross-sectional area of the positive electrode current collecting plate 44, a cross-sectional area S2 of the joint 44b is largest, a cross-sectional area S1 of the fixed portion 44a is secondly largest, and a cross-sectional area S3 of the welded portion 44c is smallest.

The fixed portion 44a of the positive electrode current collecting plate 44 is connected to the positive electrode external terminal 14, can transfer heat directly to the positive electrode external terminal 14 to release heat, and has satisfactory heat dissipation performance. Further, the welded portion 44c is connected to the wound group 3 having a large thermal capacity and can transfer heat directly to the wound group 3 to release heat, and the temperature thereof is less likely to increase. On the other hand, the joint 44b does not have a portion which can transfer heat directly and the temperature thereof is most prone to reach a high temperature among the portions of the positive electrode current collecting plate 44. Therefore, it is most effective to suppress heat generation of the joint 44b.

In this Example, the thickness t2 of the joint 44b is set to be thicker than the thickness t1 of the fixed portion 44a and the thickness t3 of the welded portion 44c. Therefore, as compared to the fixed portion 44a and the welded portion 44c, a current resistance value of the joint 44b can be lowered and thus the heat generation of the joint 44b can be suppressed.

When the entire joint 44b is thick, the effect of suppressing heat generation is largest, but even when only a portion of the entire joint 44b is thick, the effect of suppressing heat generation is obtained at the portion. For example, when the thickness of the fixed portion 44a and the thickness of the joint 44b each are not constant and each of the fixed portion 44a and the joint 44b has a portion having a large thickness and a portion having a small thickness, a maximum thickness t1max of the fixed portion 44a and a maximum thickness t2max of the joint 44b have a relation of t2max>t1max, and a minimum thickness t1min of the fixed portion 44a and a minimum thickness t2min of the joint 44b have a relation of t2min>t1min. The heat generation suppression effect is smaller as compared to a case where the entire joint 44b has a thickness relation of t2>t1 with respect to the fixed portion 44a, but the weight can be decreased and the material cost can be decreased.

Further, a maximum thickness t3max of the welded portion 44c and a maximum thickness t2max of the joint 44b have a relation of t2max>t3max and a minimum thickness t3min of the welded portion 44c and a minimum thickness t2min of the joint 44b have a relation of t2min=t3min. The heat generation suppression effect is smaller as compared to a case where the entire joint 44b has a thickness relation of t2>t3 with respect to the welded portion 44c, but the weight can be decreased and the material cost can be decreased.

Incidentally, in this Example, a case where the joint 44b of the positive electrode current collecting plate 44 is thicker than the fixed portion 44a and the welded portion 44c (t2>t1 or t2>t3) has been described, but instead of the positive electrode current collecting plate 44, the joint 24b of the negative electrode current collecting plate 24 may be thicker than the fixed portion 24a and the welded portion 24c or the joints 44b and 24b may be configured to be thick in both the positive electrode current collecting plate 44 and the negative electrode current collecting plate 24. Further, in Example described above, a case where the cross-sectional shape of the joint 44b is a rectangular shape has been described, but for example, the cross-sectional shape thereof may be a circular shape, an elliptical shape, or a polygonal shape.

FIG. 6 is a diagram illustrating temperature distribution in the current collecting plate of Example 1 and is an isothermal diagram with a scale of 1° C. FIG. 6 and Table 1 present simulation results when 500 A of current flows to the positive electrode current collecting plate 44. The fixed portion 44a and the welded portion 44c have a setting in which heat easily releases outside.

TABLE 1

|  | t2 (mm) | W2 (mm) | S2/S1 | maxT | mean T | max − mean |
|---|---|---|---|---|---|---|
| Conventional product | 2 | 15 | 0.75 | 113.1 | 103.1 | 10 |
| Example 1 | 4 | 15 | 1.5 | 88.2 | 84.0 | 4.2 | maxT: a maximum temperature (° C.) of the current collecting plate meanT: an average temperature (° C.) of the entire current collecting plate max-mean: a difference between the maximum temperature and the average temperature S1=40 (mm$^2$)

The dimension of the fixed portion 44a is the thickness t1=2.0 mm, the width W1=20 mm, and the cross-sectional area S1=40 mm$^2$. The conventional product was set to have a dimension of the thickness t2 of the joint=2.0 mm, the width W2=15 mm, and the cross-sectional area S2=30 mm$^2$, and Example 1 was set to have a dimension of the thickness t2=4.0 mm, the width W2=15 mm, and the cross-sectional area S2=60 mm$^2$. That is, in the conventional product, the thicknesses of the fixed portion, the joint, and the welded portion are constant to one another; meanwhile, in the current collecting plate of Example 1, the thickness of the joint 44b is twice the thickness of each of the fixed portion 44a and the welded portion 44c.

According to the simulation results of the conventional product, the maximum heat generation place when a current flows was the joint, the maximum temperature thereof was 113.1° C., and a difference between the maximum temperature and the average temperature was 10° C. Meanwhile, according to the simulation results of Example 1, the maximum heat generation place when a current flows was the joint 44b, the maximum temperature thereof was 88.2° C., and a difference between the maximum temperature and the average temperature was 4.2° C.

In Example 1, it was found out that when the thickness of the joint 44b is set to be thicker than the fixed portion 44a, the cross-sectional area is increased and the electric resistance is decreased so that the difference between the heat generation maximum temperature and the average temperature when a current flows can be further suppressed as compared to the case of the conventional product.

EXAMPLE 2

Next, Example 2 will be described using FIGS. 7(a) to 7(c).

Figure 7A:
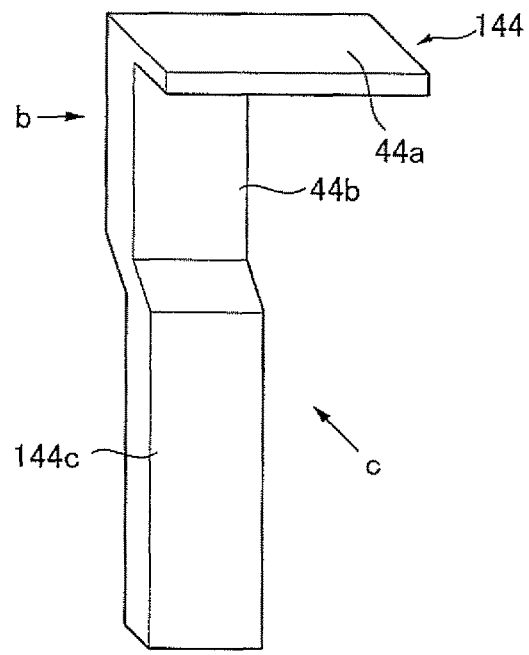
FIGS. 7A-7C are diagrams for describing the configuration of a current collecting plate in Example 2.
Figure 7B:
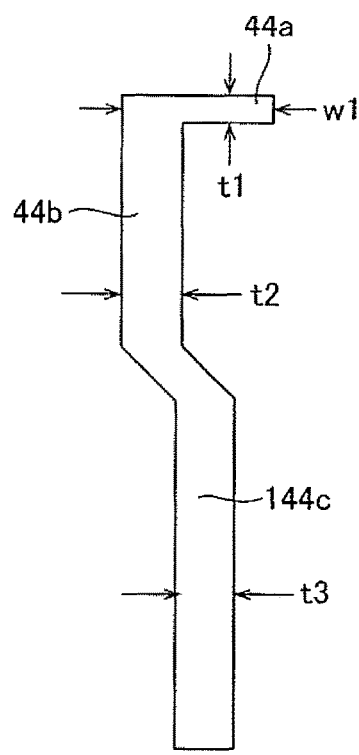
Figure 7C:
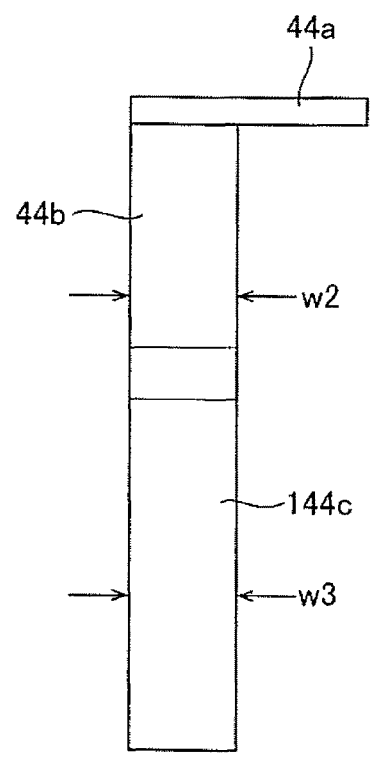

FIGS. 7(a) to 7(c) are diagrams for describing the configuration of a current collecting plate in Example 2. Incidentally, constituent elements equivalent to those in Example 1 described above are assigned the same reference numerals as in Example 1 and detailed description thereof is omitted.

Characteristic features in this Example are as follows. As compared to the configuration of Example 1, the thickness of a welded portion of a positive electrode current collecting plate 144 is also set to be increased, and heat generation of the welded portion can also be suppressed in addition to the effect of Example 1.

The positive electrode current collecting plate 144 is produced, similarly to the positive electrode current collecting plate 44 of Example 1, by casting, forging, or a method using casting and forging in combination. In a relation among the thickness t1 of the fixed portion 44a, the thickness t2 of the joint 44b, and the thickness t3 of a welded portion 144c, the positive electrode current collecting plate 144 has a portion satisfying a relation of t2>t1 and t3>t1. That is, the welded portion 144c has a thickness portion thicker than the fixed portion 44a. In this Example, the thickness t2 of the joint 44b and the thickness t3 of the welded portion 144c are set to be the same thickness and to be thicker than the thickness t1 of the fixed portion 44a. Therefore, resistance values of the joint 44b and the welded portion 144c are lowered, and thus heat generation of the joint 44b and the welded portion 144c can be suppressed.

In this Example, since the thickness t2 of the joint 44b and the thickness t3 of the welded portion 144c are set to be thicker than the thickness t1 of the fixed portion 44a, as compared to the fixed portion 44a, current resistance values of the joint 44b and the welded portion 144c can be lowered and heat generation of the joint 44b can be suppressed.

Further, since the welded portion 144c is thick, when the welded portion 144c is welded to the positive electrode metal foil-exposed portion 34b of the wound group 3, an amount of welding penetration can be increased in laser welding, and in ultrasonic welding, force is easily applied when the welded portion is held by an anvil and a horn and the number of sheets of the positive electrode metal foil-exposed portion 34b overlapped can be increased.

EXAMPLE 3

Next, Example 3 will be described using FIGS. 8(a) to 8(c) and FIGS. 9(a) to 9(c).

Figure 8A:
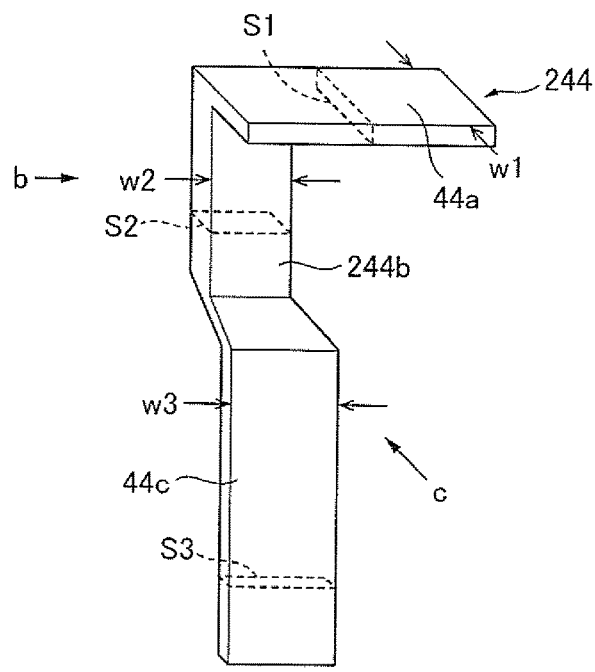
FIGS. 8A-8C are diagrams for describing the configuration of a current collecting plate in Example 3.
Figure 8B:
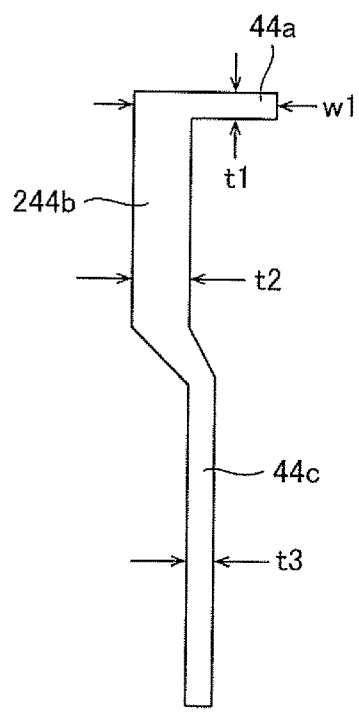
Figure 8C:
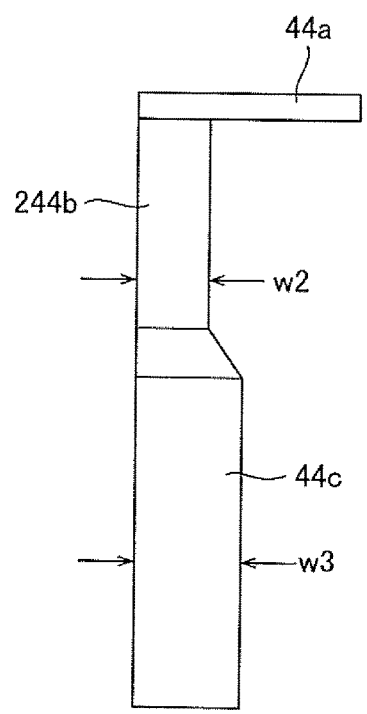
Figure 9A:
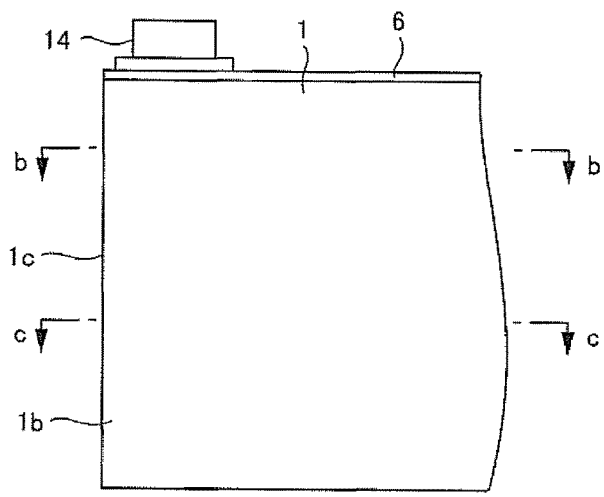
FIGS. 9A-9C are diagrams for describing an arrangement state of the current collecting plate of Example 3 and a wound group in a battery case.
Figure 9B:
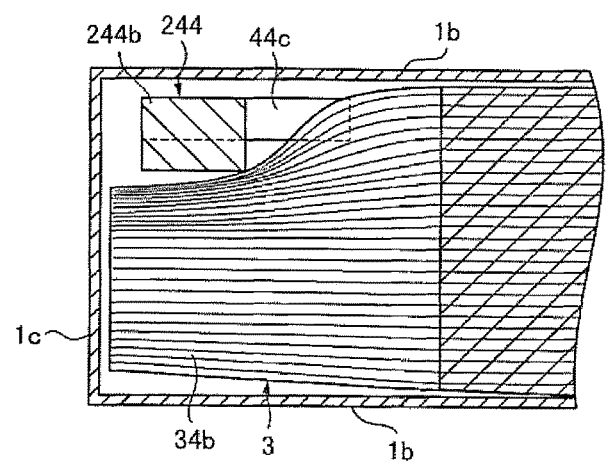
Figure 9C:
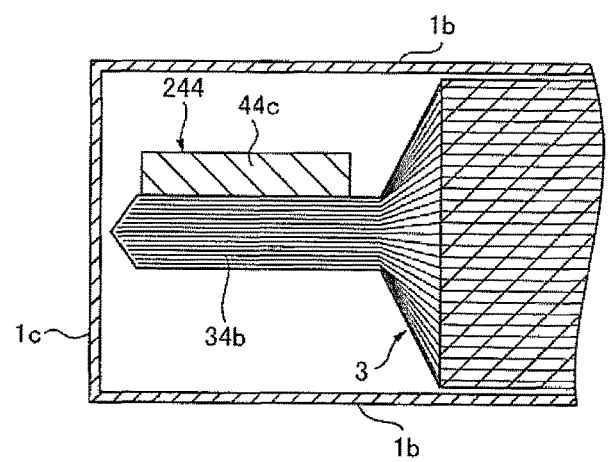

FIGS. 8(a) to 8(c) are diagrams for describing the configuration of a current collecting plate in Example 3 and FIGS. 9(a) to 9(c) are diagrams for describing an arrangement state of the current collecting plate and a wound group in a battery case of a rectangular secondary battery. FIG. 9(a) is a diagram illustrating a part of the rectangular secondary battery seen from the front face, FIG. is a cross-sectional view taken along b-b line of FIG. 9(a), and FIG. 9(c) is a cross-sectional view taken along c-c line of FIG. 9(a). Incidentally, constituent elements equivalent to those in each Example described above are assigned the same reference numerals as in each Example and detailed description thereof is omitted.

Characteristic features in this Example are as follows. The thickness of a joint 244b of a positive electrode current collecting plate 244 is set to be thicker than the fixed portion 44a and the welded portion 44c and the width of the joint 244b is set to be narrower than the fixed portion 44a and the welded portion 44c.

The positive electrode current collecting plate 244 is produced, similarly to the positive electrode current collecting plate 44 of Example 1, by casting, forging, or a method using casting and forging in combination. Particularly, as illustrated in FIG. 8(c), in the positive electrode current collecting plate 244, the width W2 of the joint 244b is narrower than the width W3 of the welded portion 44c. Further, as illustrated in FIG. 8(b), the thickness t2 of the joint 244b thicker than the thickness t1 of the fixed portion 44a and the thickness t3 of the welded portion 44c. As illustrated in FIG. 8(c), the width of the joint 244b is narrowed to be close to one side of the fixed portion 44a in the longitudinal direction. In this Example, among the fixed portion 44a, the joint 244b, and the welded portion 44c, the thickness t2 of the joint 244b is thickest and the width W2 of the joint 244b is smallest.

In the positive electrode current collecting plate 244, a minimum cross-sectional area portion of the joint 244b in a direction perpendicular to a current path is larger than at least one of each minimum cross-sectional area portion of the fixed portion 44a and the welded portion 44c in the direction perpendicular to the current path. More specifically, regarding relations between a minimum cross-sectional area S1 of the fixed portion 44a in the direction perpendicular to the current path and the width W1, a minimum cross-sectional area S2 of the joint 244b in the direction perpendicular to the current path and the width W2, and a minimum cross-sectional area S3 of the welded portion 44c in the direction perpendicular to the current path and the width W3, the positive electrode current collecting plate 244 has a portion satisfying a relation of S2>S1 and W2<W1 or S2>S3 and W2<W3.

Since the width of the joint 244b is narrowed, when the positive electrode current collecting plate 244 is assembled as the rectangular secondary battery 100, as illustrated in FIG. 9(b), a space corresponding to the narrowed width is formed inside the battery can 1, and a position of the positive electrode current collecting plate which interferes with the positive electrode metal foil-exposed portion 34b of the wound group 3 can be disposed at a position close to the outside of the wound group 3 in the winding axis direction. Therefore, the width of the positive electrode metal foil-exposed portion 34b in the wound group 3 can be further shortened, and the widths of the positive electrode mixture layer 34a and the negative electrode mixture layer 32a can be widened.

Further, in the positive electrode current collecting plate 244, among the fixed portion 44a, the joint 244b, and the welded portion 44c, the thickness t2 of the joint 244b is thickest. Therefore, in addition to the same efface as in Example 1 that heat generation can be suppressed by lowering the electric resistance of the joint 244b, the effect that the volume of the rectangular secondary battery 100 can be increased by using a space inside the battery can generated by narrowing the width w2 of the joint 244b can be exhibited.

EXAMPLE 4

Next, Example 4 will be described using FIGS. 10(a) to 10(c).

Figure 10A:
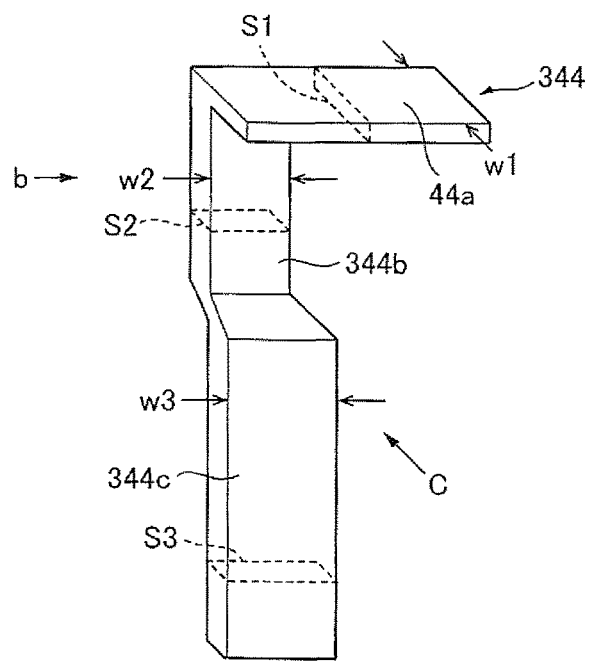
FIGS. 10A-10C are diagrams for describing the configuration of a current collecting plate in Example 4.
Figure 10B:
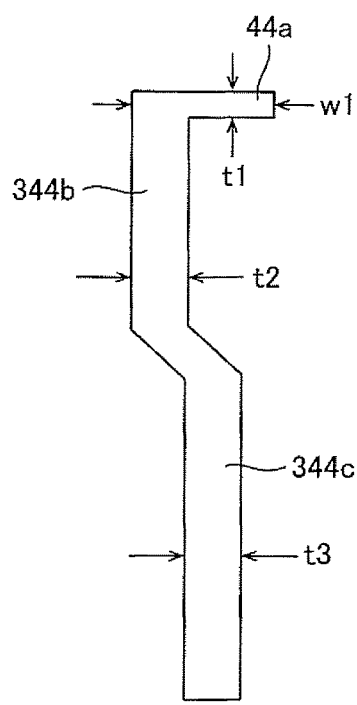
Figure 10C:
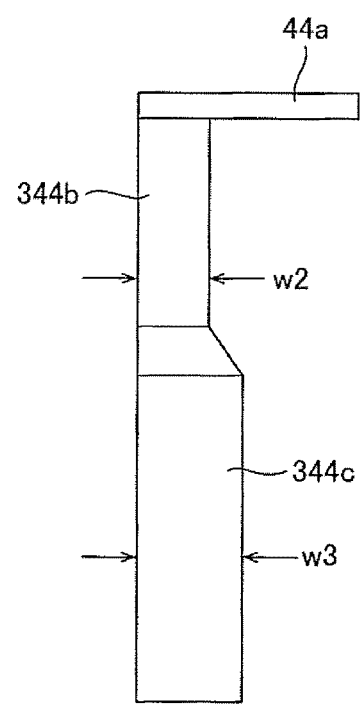

FIGS. 10(a) to 10(c) are diagrams for describing the configuration of a current collecting plate in Example 4. Incidentally, constituent elements equivalent to those in each Example described above are assigned the same reference numerals as in each Example and detailed description thereof is omitted.

A characteristic feature in this Example is as follows. As compared to the configuration of Example 3, the thickness of a welded portion 344c of a positive electrode current collecting plate 344 is also set to be thick.

The positive electrode current collecting plate 344 is produced, similarly to the positive electrode current collecting plate 244 of Example 3, by casting, forging, or a method using casting and forging in combination. In a relation among the thickness t1 of the fixed portion 44a, the thickness t2 of a joint 344b, and the thickness t3 of the welded portion 344c, the positive electrode current collecting plate 344 has a portion satisfying a relation of t2>t1 and t3>t1.

In the positive electrode current collecting plate 344, a minimum cross-sectional area portion of the welded portion 344c in the direction perpendicular to the current path is larger than a minimum cross-sectional area portion of the fixed portion 44a in the direction perpendicular to the current path. More specifically, regarding relations between the minimum cross-sectional area S1 of the fixed portion 44a in the direction perpendicular to the current path and the width W1, the minimum cross-sectional area S2 of the joint 344b in the direction perpendicular to the current path and the width W2, and the minimum cross-sectional area S3 of the welded portion 344c in the direction perpendicular to the current path and the width W3, the positive electrode current collecting plate 344 has a relation of S2>S1, W2<W1, S3>S1, and W3<W1.

In this Example, since the thickness t2 of the joint 344b and the thickness t3 of the welded portion 344c are set to be thicker than the thickness t1 of the fixed portion 44a, resistance values of the joint 344b and the welded portion 344c are lowered, and thus heat generation of the joint 344b and the welded portion 344c is suppressed. Therefore, in addition to the effect of Example 3 that the volume of the rectangular secondary battery 100 can be increased, current resistance values of the joint 344b and the welded portion 344c can be further lowered as compared to the fixed portion 44a and the effect that heat generation of the joint 344b can be suppressed is obtained.

Further, since the welded portion 344c is thick, when the welded portion 344c is welded to the positive electrode metal foil-exposed portion 34b of the wound group 3, an amount of welding penetration can be increased in laser welding, and in ultrasonic welding, force is easily applied when the welded portion is held by an anvil and a horn and the number of sheets of the positive electrode metal foil-exposed portion 34b overlapped can be increased.

EXAMPLE 5

Next, Example 5 will be described using FIGS. 11(a) to 13.

Figure 11A:
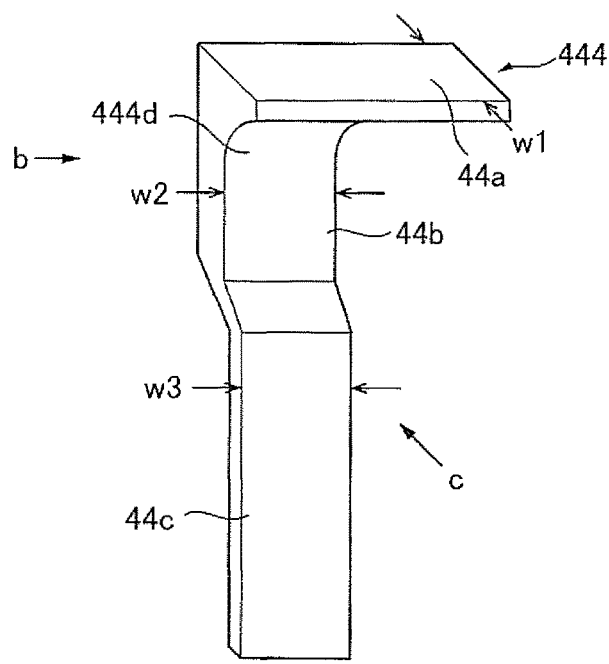
FIGS. 11A-11C are diagrams for describing the configuration of a current collecting plate in Example 5.
Figure 11B:
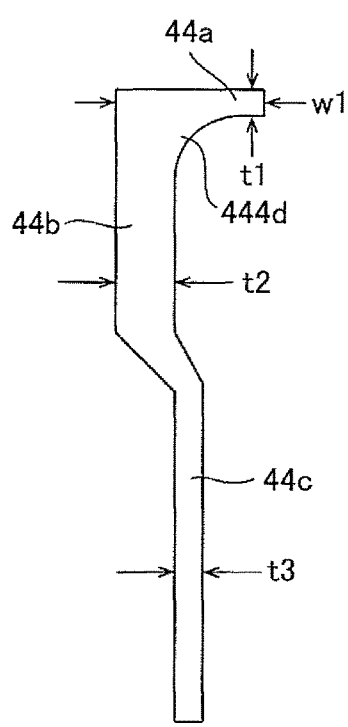
Figure 11C:
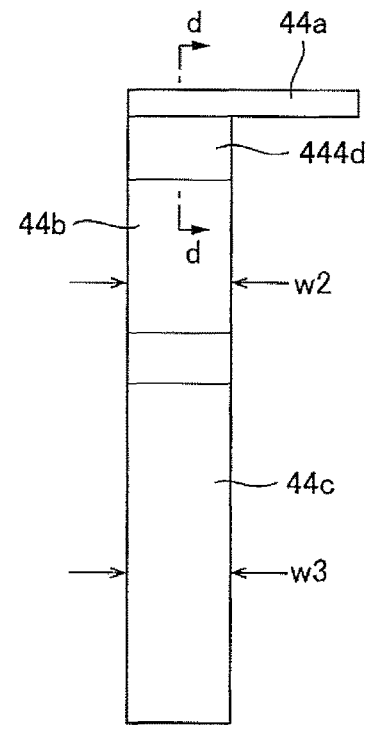
Figure 12A:
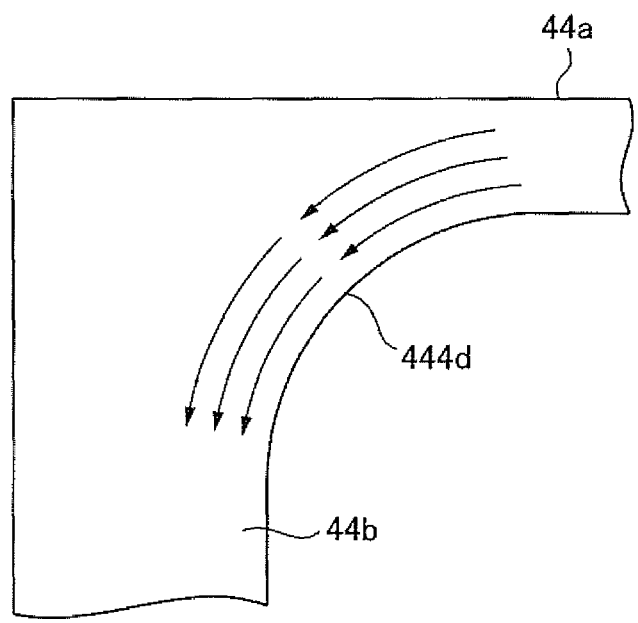
FIGS. 12A and 12B are diagrams for describing the flow of current in each current collecting plate of Example 1 FIG. 12B and Example 5 FIG. 12A).
Figure 12B:
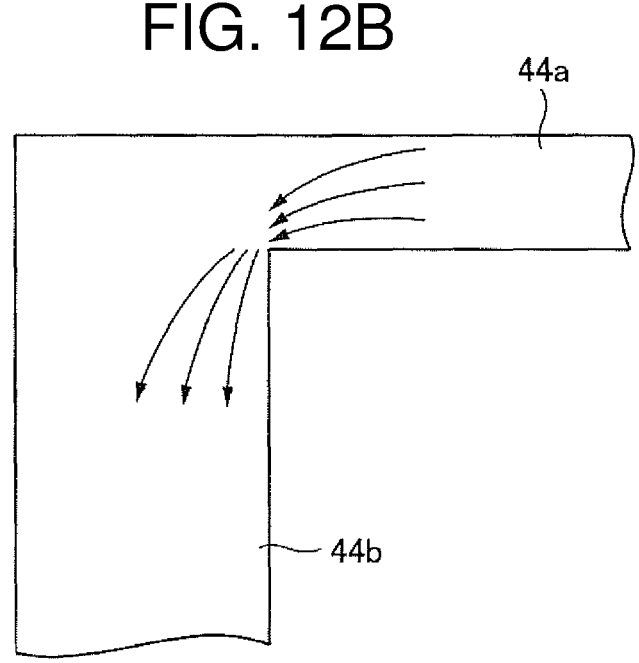
Figure 13:
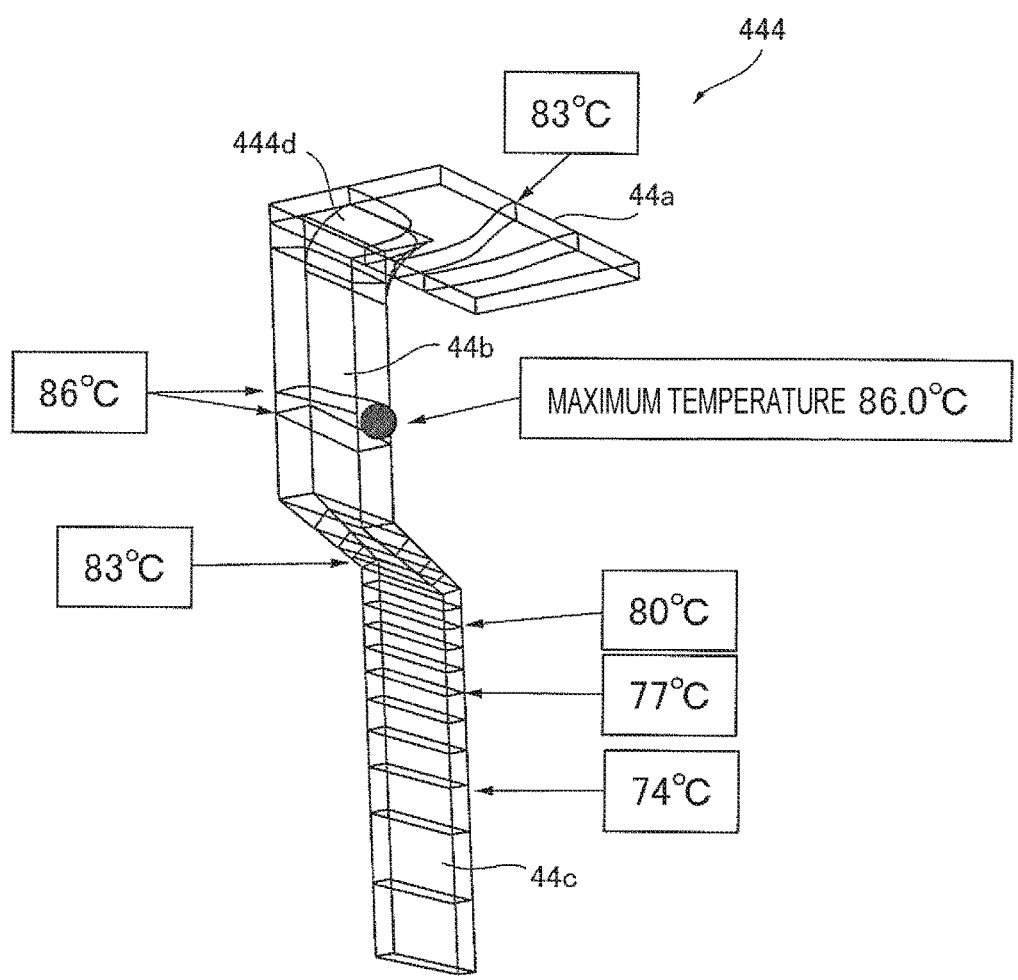
FIG. 13 is a diagram illustrating temperature distribution in the current collecting plate of Example 5.

FIGS. 11(a) to 11(c) are diagrams for describing the configuration of a current collecting plate in Example 5, FIG. 12(a) is a cross-sectional view taken along d-d line of FIG. 11(c), FIG. 12(b) is a diagram corresponding to Example 1, and FIG. 13 is a diagram illustrating temperature distribution in the current collecting plate of Example 5 and an isothermal diagram with a scale of 1° C. Incidentally, constituent elements equivalent to those in each Example described above are assigned the same reference numerals as in each Example and detailed description thereof is omitted.

A characteristic feature in this Example is as follows. As illustrated in FIG. 11(b), the thickness of a joint portion of the joint 44b with the fixed portion 44a is configured to be thicker than the thickness of the joint portion close to the welded portion 44c.

A positive electrode current collecting plate 444 is produced, similarly to the positive electrode current collecting plate 44 of Example 1, by casting, forging, or a method using casting and forging in combination. The positive electrode current collecting plate 444 is provided with an R portion 444d, in which the thickness t2 of the joint 44b is gradually increased, at a joint portion of the joint 44b with the fixed portion 44a, as compared to the configuration of Example 1. The R portion 444d is formed such that the thickness t2 is gradually increased as being close to the fixed portion 44a and the R portion 444d is smoothly continued to the surface of the fixed portion 44a.

In Example 1, as illustrated in FIG. 12(b), a joint portion of the joint 44b with the fixed portion 44a is formed at an approximately right angle. Further, since the cross-sectional area of the fixed portion 44a and the cross-sectional area of the joint 44b are different from each other, current densities flowing in each of fixed portion 44a and the joint 44b are also different from each other. Therefore, for example, when a large current flows from the fixed portion 44a toward the joint 44b, there is a concern that current concentration occurs in the corner portion and thus heat generation occurs at the corner portion. On the other hand, in this Example, as illustrated in FIG. 12(a), since the R portion 444d is provided at the joint portion of the joint 44b with the fixed portion 44a, current concentration at the joint portion between the fixed portion 44a and the joint 44b is alleviated and heat generation at the joint portion is suppressed.

Therefore, in addition to the same effect as in Example 1 that heat generation can be suppressed by lowering the electric resistance of the joint 44b, the effect that heat generation of the joint portion between the fixed portion 44a and the joint 44b can be effectively suppressed can be exhibited.

FIG. 13 and Table 2 present simulation results of Joule heat generation when 500 A of current flows to the positive electrode current collecting plate 444.

TABLE 2

|  | r1 (mm) | maxT | mean T | max-mean |
| --- | --- | --- | --- | --- |
| Example 1 | 0 | 88.2 | 84.0 | 4.2 |
| Example 5 | 6 | 86.0 | 82.2 | 3.8 | r1: a curvature radius of the R portion

In Example 5, the curvature radius r1 of the R portion 444d was set to have a dimension of 6 mm. That is, the conventional product is not provided with the R portion; meanwhile, the positive electrode current collecting plate 444 of Example 5 has the R portion 444d, in which the thickness t2 of the joint 44b is gradually increased and which is smoothly continued to the surface of the fixed portion 44a, at the joint portion of the joint 44b with the fixed portion 44a.

According to the simulation results of Example 1, the maximum heat generation place when a current flows was the joint 44b, the maximum temperature thereof was 88.2° C., and a difference between the maximum temperature and the average temperature was 4.2° C. Meanwhile, according to the simulation results of Example 5, the maximum heat generation place when a current flows was the joint 44b, the maximum temperature thereof was 86.0° C., and a difference between the maximum temperature and the average temperature was 3.8° C.

In Example 5, it was found out that when current concentration at the joint portion is alleviated by providing the R portion 444d at the joint portion of the joint 44b with the fixed portion 44a, the difference between the heat generation maximum temperature and the average temperature when current flows can be further suppressed as compared to Example 1.

EXAMPLE 6

Next, Example 6 will be described using FIGS. 14(a) to 14(c) and FIG. 15.

Figure 14A:
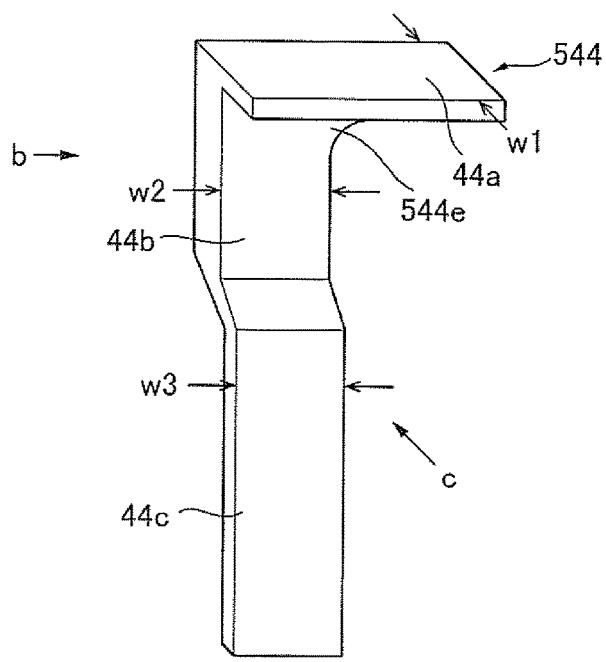
FIG. 14A-14C are diagrams for describing the configuration of a current collecting plate in Example 6.
Figure 14B:
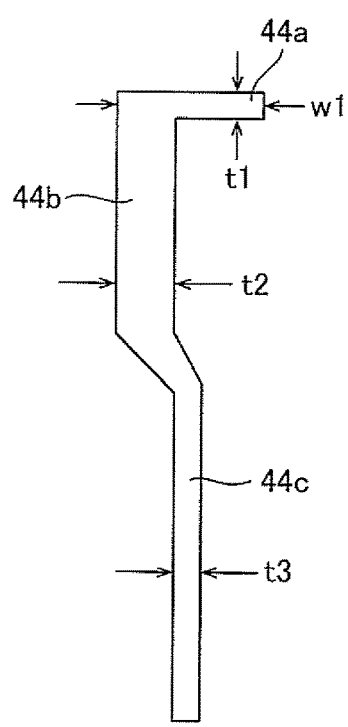
Figure 14C:
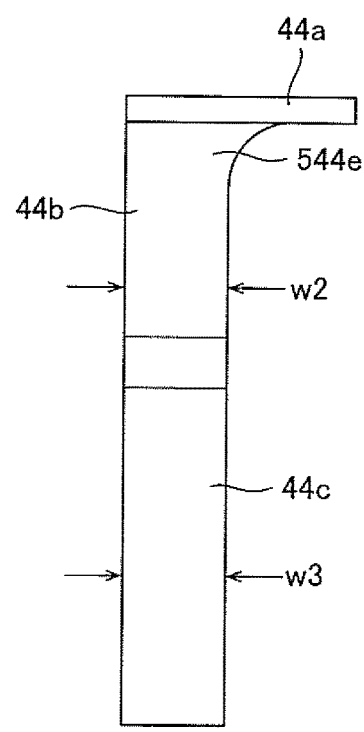
Figure 15:
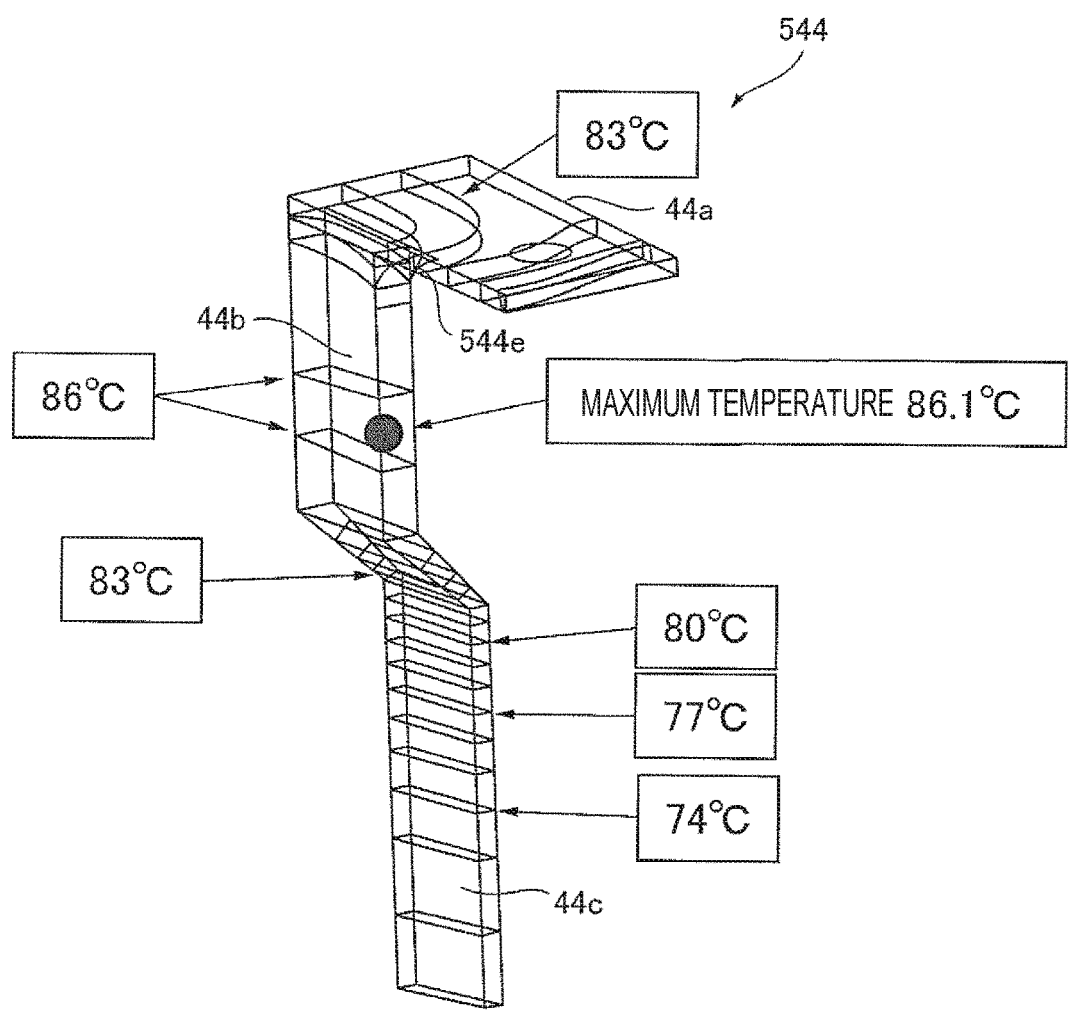
FIG. 15 is a diagram illustrating temperature distribution in the current collecting plate of Example 6.

FIGS. 14(a) to 14(c) are diagrams for describing the configuration of a current collecting plate in Example 6, and FIG. 15 is a diagram illustrating temperature distribution in the current collecting plate of Example 6 and an isothermal diagram with a scale of 1° C. Incidentally, constituent elements equivalent to those in each Example described above are assigned the same reference numerals as in each Example and detailed description thereof is omitted.

A characteristic feature in this Example is as follows. As illustrated in FIG. 14(c), the width of the joint portion of the joint 44b with the fixed portion 44a is configured to be larger than the width of the joint portion close to the welded portion 44c.

A positive electrode current collecting plate 544 is produced, similarly to the positive electrode current collecting plate 44 of Example 1, by casting, forging, or a method using casting and forging in combination. The positive electrode current collecting plate 544 is provided with an R portion 544e, in which the width W2 of the joint 44b is gradually increased, at the joint portion of the joint 44b with the fixed portion 44a, as compared to the configuration of Example 1. The R portion 544e is formed such that width W2 is gradually increased as being close to the fixed portion 44a and the R portion 544e is smoothly continued to the surface of the fixed portion 44a.

In this Example, since the R portion 544e is provided at the joint portion of the joint 44b with the fixed portion 44a, current concentration at the joint portion between the fixed portion 44a and the joint 44b is alleviated and heat generation at the joint portion is suppressed. Further, since the width of the joint portion is widened, the cross-sectional area can be widened without interference with the wound group 3.

Therefore, in addition to the same effect as in Example 1 that heat generation can be suppressed by lowering the electric resistance of the joint 44b, the effects that heat generation at the joint portion between the fixed portion 44a and the joint 44b can be suppressed effectively and there is no influence on the volume of the wound group can be exhibited.

FIG. 15 and Table 3 present simulation results of Joule heat generation when 500 A of current flows to the positive electrode current collecting plate 544.

TABLE 3

|  | r2 (mm) | maxT | mean T | max-mean |
| --- | --- | --- | --- | --- |
| Example 1 | 0 | 88.2 | 84.0 | 4.2 |
| Example 6 | 6 | 86.1 | 82.1 | 4.0 | r2: a curvature radius of the R portion

In Example 6, the curvature radius r2 of the R portion 544e was set to have a dimension of 6 mm. That is, the conventional product is not provided with the R portion; meanwhile, the positive electrode current collecting plate 544 of Example 6 has the R portion 544e, in which the width W2 of the joint 44b is gradually increased and which is smoothly continued to the surface of the fixed portion 44a, at the joint portion of the joint 44b with the fixed portion 44a and the positive electrode current collecting plate 544.

According to the simulation results of Example 1, the maximum heat generation place when a current flows was the joint 44b, the maximum temperature thereof was 88.2° C., and a difference between the maximum temperature and the average temperature was 4.2° C. Meanwhile, according to the simulation results of Example 6, the maximum heat generation place when a current flows was the joint 44b, the maximum temperature thereof was 86.1° C., and a difference between the maximum temperature and the average temperature was 4.0° C.

In Example 6, it was found out that when current concentration at the joint portion is alleviated by providing the R portion 544e at the joint portion of the joint 44b with the fixed portion 44a, the difference between the heat generation maximum temperature and the average temperature when current flows can be further suppressed as compared to Example 1.

EXAMPLE 7

Next, Example 7 will be described using FIGS. 16(*a*) to 16(*c*).

Figure 16A:
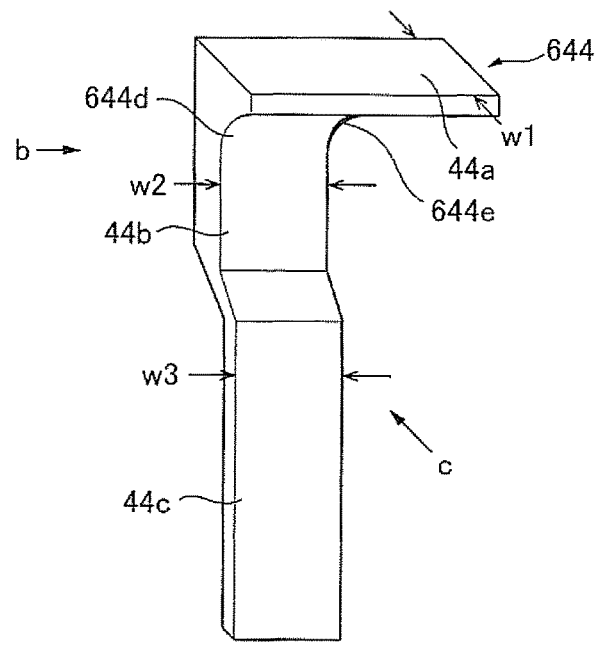
FIGS. 16A-16C are diagrams for describing the configuration of a current collecting plate in Example 7.
Figure 16B:
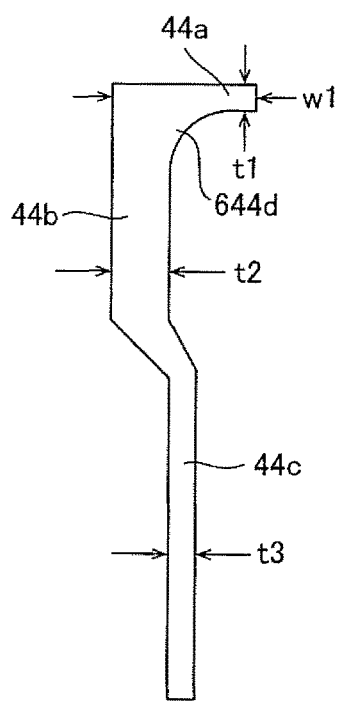
Figure 16C:
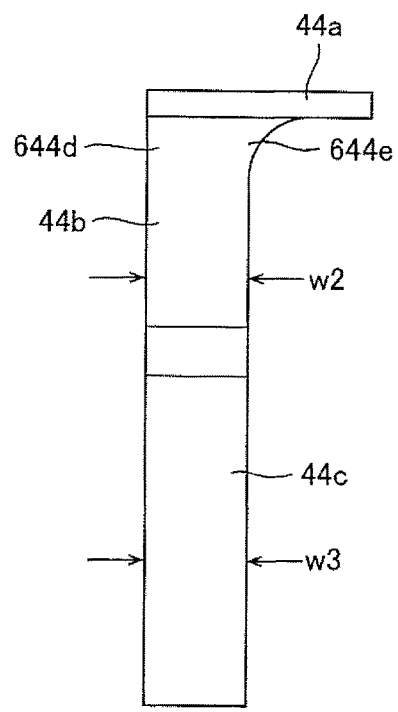

FIGS. 16(*a*) to 16(*c*) are diagrams for describing the configuration of a current collecting plate in Example 7. Incidentally, constituent elements equivalent to those in each Example described above are assigned the same reference numerals as in each Example and detailed description thereof is omitted.

Characteristic features in this Example are as follows. As illustrated in FIG. 16(*b*), the thickness of the joint portion of the joint 44b with the fixed portion 44a is configured to be thicker than the thickness of the joint portion close to the welded portion 44c, and as illustrated in FIG. 16(*c*), the width of the joint portion of the joint 44b with the fixed portion 44a is configured to be larger than the width of the joint portion close to the welded portion 44c.

The positive electrode current collecting plate 644 is produced, similarly to the positive electrode current collecting plate 44 of Example 1, by casting, forging, or a method using casting and forging in combination. In the positive electrode current collecting plate 644, an R portion 644d in which the thickness t2 of the joint 44b is gradually increased and an R portion 644e in which the width W2 of the joint 44b is gradually increased are provided at the joint portion of the joint 44b with the fixed portion 44a, as compared to the configuration of Example 1. The R portion 644d is formed such that the thickness t2 is gradually increased as being close to the fixed portion 44a and the R portion 644d is smoothly continued to the surface of the fixed portion 44a. The R portion 644e is formed such that the width W2 is gradually increased as being close to the fixed portion 44a and the R portion 644e is smoothly continued to the surface of the fixed portion 44a.

In this Example, as illustrated in FIGS. 16(*b*) and 16(*c*), since the R portions 644d and 644e are provided at the joint portion of the joint 44b with the fixed portion 44a, current concentration at the joint portion between the fixed portion 44a and the joint 44b is alleviated and heat generation at the joint portion is suppressed. Further, since the width of the joint portion is widened, the cross-sectional area can be widened without interference with the wound group 3. Therefore, in addition to the same effect as in Example 1 that heat generation can be suppressed by lowering the electric resistance of the joint 44b, the effects that heat generation at the joint portion between the fixed portion 44a and the joint 44b can be suppressed effectively and there is no influence on the volume of the wound group can be exhibited.

EXAMPLE 8

Next, Example 8 will be described using FIGS. 17(*a*) to 17(*c*).

Figure 17A:
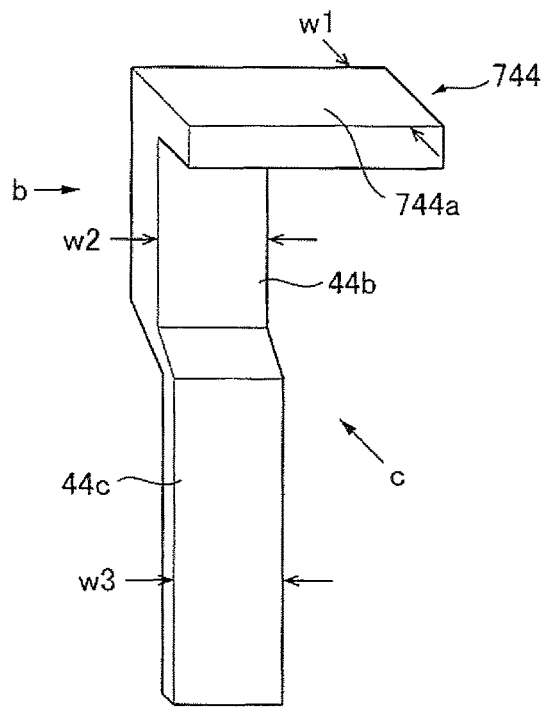
FIG. 17A-17C are diagrams for describing the configuration of a current collecting plate in Example 8.
Figure 17B:
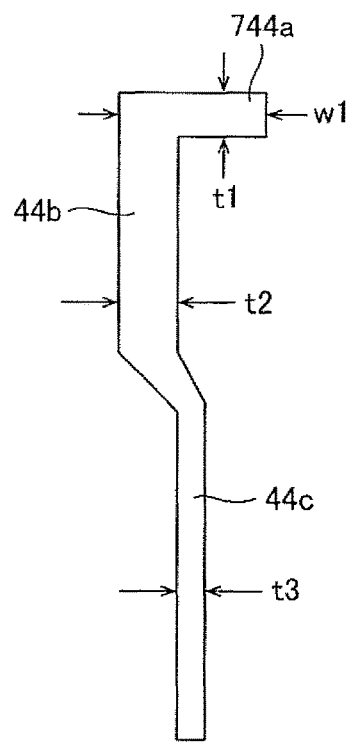
Figure 17C:
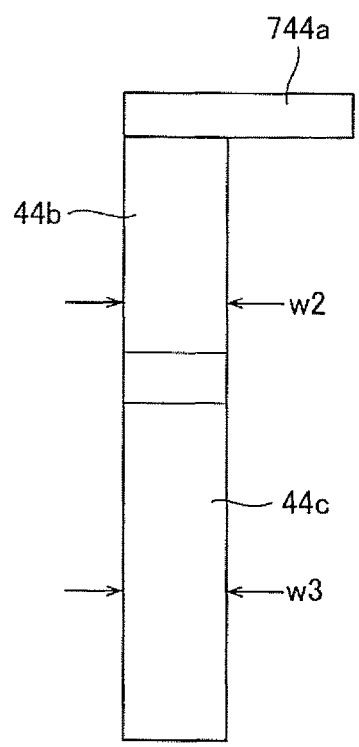

FIGS. 17(*a*) to 17(*c*) are diagrams for describing the configuration of a current collecting plate in Example 8. Incidentally, constituent elements equivalent to those in each Example described above are assigned the same reference numerals as in each Example and detailed description thereof is omitted.

Characteristic features in this Example are as follows. As compared to the configuration of Example 1, the thickness of a fixed portion of a positive electrode current collecting plate 744 is also increased, and in addition to the effect of Example 1, heat generation of the fixed portion can also be suppressed.

The positive electrode current collecting plate 744 is produced, similarly to the positive electrode current collecting plate 44 of Example 1, by casting, forging, or a method using casting and forging in combination. In a relation among the thickness t1 of a fixed portion 744a, the thickness t2 of the joint 44b, and the thickness t3 of the welded portion 44c, the positive electrode current collecting plate 744 has a portion satisfying a relation of t2>t3 and t1>t3. Therefore, resistance values of the joint 44b and the fixed portion 744a are lowered, and thus heat generation of the fixed portion 744a and the joint 44b can be suppressed.

In this Example, since the thickness t1 of the fixed portion 744a and the thickness t2 of the joint 44b are set to be thicker than the thickness t3 of the welded portion 44c, as compared to the welded portion 44c, current resistance values of the fixed portion 744a and the joint 44b can be lowered and heat generation of the joint 44b can be suppressed. Further, since the fixed portion 744a is thick, the fixed portion 744a has high rigidity, and when the fixed portion 744a is fixed to the battery lid 6 by caulking-fixation, the fixed portion 744a can be more strongly fixed.

Incidentally, in each Example described above, a case where the configuration of the present invention is applied to the positive electrode has been described, but instead of the positive electrode, the configuration of the present invention may be applied to the negative electrode or can be applied to both the positive electrode and the negative electrode.

Hereinbefore, the embodiments of the present invention have been described in detail; however, the present invention is not limited to the above-described embodiments and various types of design alteration can be performed in a range of not departing from a spirit of the present invention as described in the appended claims. For example, the embodiments have been described in detail for describing the present invention in an easily understandable manner, and it is not limited to an embodiment necessarily including the entire configuration described above. In addition, a part of the configuration of a specific embodiment can be replaced with the configuration of another embodiment, and the configuration of another embodiment may be added to that of a specific embodiment. Furthermore, addition, deletion, replacement, with the use of another configuration, may be applied to a part of the configuration of each of the embodiments.

REFERENCE SIGNS LIST 1 battery can
3 wound group
6 battery lid
12 negative electrode external terminal
14 positive electrode external terminal
24 negative electrode current collecting plate
32 negative electrode
32a negative electrode mixture layer
32b negative electrode metal foil-exposed portion
33 separator
34 positive electrode
34a positive electrode mixture layer
34b positive electrode metal foil-exposed portion
35 separator
44 positive electrode current collecting plate
100 rectangular secondary battery

The invention claimed is:

1. A rectangular secondary battery comprising:
a flat wound group which is obtained by winding an electrode and has a metal foil-exposed portion;
a battery can which stores the wound group;
a battery lid which seals the battery can;
an external terminal which is provided on the battery lid; and
a current collecting plate which electrically connects the external terminal and the wound group, the current collecting plate including a fixed portion fixed on the battery lid, a welded portion welded on the metal foil-exposed portion of the wound group, and a joint connecting the fixed portion and the welded portion,
wherein the joint includes an inclined portion adjacent to the welded portion, the inclined portion having surfaces that are inclined relative to the welded portion, such that the welded portion is disposed offset from an upper portion of the joint above the inclined portion and the welded portion is disposed directly under the fixed portion,
wherein a width of the fixed portion in a lateral direction and a longitudinal direction is greater than widths of the joint portion and the welded portion in the lateral and longitudinal directions, wherein a longest length of the battery lid is in the longitudinal direction, and
wherein in the current collecting plate, a longitudinal width of a cross-section perpendicular to a current path of the upper portion of the joint is smaller than longitudinal widths of the cross-section perpendicular to the current path of the fixed portion and the welded portion, and a thickness of the joint is greater than thicknesses of the fixed portion and the welded portion.

2. The rectangular secondary battery according to claim 1, wherein the welded portion has a thickness portion thicker than the fixed portion.

3. The rectangular secondary battery according to claim 2, wherein a minimum cross-sectional area portion of the joint in a direction perpendicular to a current path is larger than at least one of minimum cross-sectional area portions of the fixed portion and the welded portion in the direction perpendicular to the current path.

4. The rectangular secondary battery according to claim 3, wherein a minimum cross-sectional area portion of the welded portion in the direction perpendicular to the current path is larger than the minimum cross-sectional area portion of the fixed portion in the direction perpendicular to the current path.

5. The rectangular secondary battery according to claim 1, wherein the current collecting plate has a thickness of a joint portion of the joint with the fixed portion thicker than a thickness of the joint portion close to the welded portion.

6. The rectangular secondary battery according to claim 1, wherein the current collecting plate has a width of a joint portion of the joint with the fixed portion larger than a width of the joint portion close to the welded portion.

7. The rectangular secondary battery according to claim 1, wherein the current collecting plate is used for a positive electrode.

8. The rectangular secondary battery according to claim 1, wherein the current collecting plate is produced by casting.

9. The rectangular secondary battery according to claim 8, wherein in the current collecting plate, a surface of the welded portion is polished.

10. The rectangular secondary battery according to claim 1, wherein the width of the joint is narrowed to be close to one side of the fixed portion in the longitudinal direction.

11. The rectangular secondary battery according to claim 1, wherein the joint faces a wide side of the battery can, and the joint is bent at a lateral edge of the fixed portion and extends toward the bottom along the wide side of the battery can.

* * * * *